United States Patent [19]
Seitz

[11] Patent Number: 5,463,886
[45] Date of Patent: Nov. 7, 1995

[54] METHOD AND APPARATUS FOR MANUFACTURING OF SOLDERING ROD CONTAINING COPPER

[75] Inventor: Reiner Seitz, Helsa, Germany

[73] Assignee: Rothenberger Werkzeuge-Maschinen GmbH, Kelkheim/Taunus, Germany

[21] Appl. No.: 690,942

[22] PCT Filed: Aug. 31, 1990

[86] PCT No.: PCT/EP90/01453

§ 371 Date: May 6, 1991

§ 102(e) Date: May 6, 1991

[87] PCT Pub. No.: WO91/03356

PCT Pub. Date: Mar. 21, 1991

[30] Foreign Application Priority Data

Sep. 4, 1989 [DE] Germany .................. 39 29 287.8

[51] Int. Cl.⁶ .................. B21B 1/16; B21B 15/00; B21C 23/08
[52] U.S. Cl. .................. 72/13; 72/200; 72/206; 72/256; 72/342.96; 148/432; 148/576; 148/684
[58] Field of Search .................. 72/200, 206, 234, 72/254, 256, 257, 342.96, 365.2, 366.2, 13, 203; 148/432, 566, 576, 679, 680, 681, 684

[56] References Cited

U.S. PATENT DOCUMENTS

| | | | |
|---|---|---|---|
| 2,290,684 | 7/1942 | Graham | 148/432 |
| 2,795,520 | 6/1957 | Ballentine | 148/432 |
| 2,897,107 | 7/1959 | Carlen et al. | 148/432 |
| 3,462,991 | 8/1969 | Asari | 72/257 |
| 4,307,591 | 12/1981 | Steinbock | 72/201 |
| 4,488,710 | 12/1984 | Greenberger | 72/201 |
| 4,569,217 | 2/1986 | Properzi | 72/206 |
| 4,759,207 | 7/1988 | Hawkes | 72/257 |
| 4,840,051 | 6/1989 | Boratto et al. | 72/366.2 |
| 5,058,410 | 10/1991 | Losch et al. | 148/576 |

FOREIGN PATENT DOCUMENTS 0038703  2/1986  Japan ......................... 72/234

OTHER PUBLICATIONS

Dies, Dr. Ing. Kurt, *Kupfer und Kupferlegierungen in Der Technik*, Springer Publishing, 1967, pp. 655–663.

Primary Examiner—Lowell A. Larson
Assistant Examiner—Thomas C. Schoeffler
Attorney, Agent, or Firm—Felfe & Lynch

[57] ABSTRACT

The invention concerns a process and an apparatus for manufacturing soldering rods with a copper percentage of at least 60 weight-%. An extruder serves to convert a block of the alloy at a temperature between 540° and 680° C. into an individual wire of a maximum diameter of 10 mm. Upon emerging from the extruder, the wire is chilled to a temperature below 250° C. and either intermediately stored or directly further processed. Immediately following a conductive heating to temperature between 200° and 280° C., the wire is fed to a multi-stage reducing mill where it is reduced by rolling in each stage by a maximum of 25% until it has reached its final cross section.

23 Claims, 4 Drawing Sheets

METHOD AND APPARATUS FOR MANUFACTURING OF SOLDERING ROD CONTAINING COPPER

BACKGROUND OF THE INVENTION

The invention concerns a process for manufacturing soldering rods which contain at least 60 weight-% copper, preferably at least 80 weight-%, and at least one alloy component of the group phosphorus and silver by forming a block of a corresponding copper alloy into a wire at temperatures below the eutectic point.

Copper alloys of the above composition play a very special role as hard solders in soldering technology. Copper-phosphorus and copper-silver-phosphorus alloys are particularly preferred because of their low melting points and their low viscosity. According to DIN 8513 conventional copper alloys include LCU-P6 (6% phosphorus, rest copper) and LCU-P8 (8% phosphorus, rest copper). Also used are copper-silver alloys with a silver percentage between 2 and 15 wt. % (rest copper, optionally containing traces of tin, zinc and lead).

Both the phosphorus-containing and the silver-containing soldering alloys cause significant problems during the manufacture of the soldering rods which are obtained by cutting the wires into segments. Whereas the phosphorus-containing soldering material becomes more and more brittle with an increasing phosphorus content, the silver-containing soldering material is relatively ductile but is slow in gaining fluidity so that the forming speed is limited. Both the brittleness and the slow forming speed obstruct an economical manufacture of soldering rods which have to be produced from a block of a correspondingly large cross section into wires of a smaller cross section by means of extrusion. The diameter and/or cross section of these wires must then subsequently be reduced again by rolling and/or drawing.

Present manufacturing processes make use of completely alloyed cylindrical blocks, also referred to as "slugs", which have a length of 300 mm, a diameter of 83 mm and a weight of approximately 11.8 kg. These blocks are heated up to temperatures between 550 and 600° C. and, by means of extrusion, they are simultaneously formed into several individual wires of desired final dimensions. Between 10 and 20 individual wires are simultaneously produced depending on the cross section of the wire. The handling of the wire bundles, however, which have to be withdrawn from the extruder, is difficult and renders a large-scale industrial production almost impossible. Already the extrusion involves a material loss of more than 5%.

There is further loss of material during the continued manufacture. The bundles of wires that are withdrawn are bonded together more or less strongly due to material adhesion. They are usually cut to conventional lengths of 385 or 500 mm, for example, by shearing or stamping. The quality of these individual rods which are obtained by cutting through an entire bundle of wires is by far not satisfactory with respect to the quality of the cut. Consequently, the cutting results in further loss of material which amounts to approximately 10% of the initially used material.

The rods that were cut to length and provided with dark oxide films must subsequently be pickled in diluted sulfuric acid, then rinsed with water and after the rinsing barrel-polished with wood chips to regain a metallic shine. This process also involves an extraordinary amount of labor and cost since it requires complicated processes for the disposal of sulfuric acid and sulfate solutions to meet requirements of environmental protection.

Although the above described loss of material is only temporary since the alloy can be recovered again by melting, this "recycling" still constitutes a major cost factor that can not be transferred to the customer. Ultimately, the remelting, due to the energy consumption involved, is also an environmental load to be avoided.

Another method that has been applied is the use of extrusion processes to produce wires of larger diameters where the cross section is then reduced by means of rolling and/or drawing thus obtaining, for example, prismatic cross sections such as square cross sections. However, these measures involve an extraordinary amount of labor and cost. In case of phosphorus copper solder this is due to the high brittleness and with respect to the silver-copper solder, it is due to the slow flow speed.

Pages 655 et. seq. of the book by Dr. Ing. Kurt Dies "Kupfer und Kupferlegierungen in der Technik" [Copper and Copper Alloys in Technology], Springer Publishing, 1967, state that the copperphosphorus system can be formed by hot rolling, hot pressing or forging, however only as long as the shaping is carried out in the pure α-range. According to the phase diagram of page 656, however, the α-phase already ends at a phosphorus percentage of approximately 2 weight percent.

The eutectic point of the copper-phosphorus system is at 714° C., and the author further states that alloys of a high phosphorus content must be processed at approximately 200° C. below the eutectic point. For a phosphorus content of 8%, a favorable extrusion temperature would hence range between 500° and 530°C. The process, however, faces here a significant form change resistance.

The extrusion process discussed in the introduction is, however, by no means the final step in the manufacture of soldering rods. Page 659 of the same book states that alloys of the copper-phosphorus system with a phosphorus content over 3% can no longer be cold formed by conventional drawing.

The author Dr. Dies further states on page 660 that a pressed eutectic copper-phosphorus alloy with 8.5% phosphorus, for example, can be readily formed at a temperature above 200° C. so that alloys can be hot rolled into thin bands for soldering foils at 300° to 400° C.

This data alone, however, does not allow the economical manufacture of soldering foils nor of soldering wires. It is extremely difficult, for example, to heat up the initial material for soldering foils in a furnace to corresponding temperatures and to subsequently roll it within the temperatures indicated since there is an intimate thermal contact of the thermally well conductive soldering material to its surroundings and to the rolls of the rolling mill which cannot be heated up to corresponding temperatures.

U.S. Pat. No. 1,954,168 discloses soldering material with a phosphorus content between 6 and 9%. Knowing that soldering materials of this kind are difficult to form when the phosphorus content is at 6% and more, the inventor proposed to mix copper with a copper alloy which contains approximately 15% phosphorus. The total phosphorus content, however, should be above 2.5% and below 6%. The corresponding alloy is cast into plates and in numerous passes with a corresponding intermediate heating to temperatures between 350° and 600° C., it is rolled into sheets of approximately 0.5 mm in thickness. The cutting of the thin sheets produces structures similar to those of silver tinsels. The manufacture of soldering rods from practically endless soldering wire is not disclosed. An essentially continuous method of operation is not described either.

Moreover, the known process for manufacturing soldering foils is extremely energy-consuming due to the unfavorable ratio of surface to volume. Especially the relatively high roll temperatures are already in a range where pronounced surface oxidation occurs.

From the publication "Chemical Abstracts, " 1981, volume 94, page , 269, quotation 94:212902 m, it is known to roll ingots of a copper-silver base alloy for soldering purposes with 15% silver and 5% phosphorus at 500 ° C. into bands of 3 mm in thickness. Due to oxidation, this process also has the disadvantage that the intermediate products must be pickled in sulfuric acid although the rolling temperatures are significantly below 540° C. This process does not allow the manufacture of soldering rods from a practically endless soldering wire either.

SUMMARY OF THE INVENTION

The invention is hence based on the object of providing a largely continuous process for the manufacture of the soldering rods of the above described composition. The process works economically and with a minimum of waste, it produces soldering rods of perfect qualities with respect to both geometric form (cut edges) and surface properties (metallic shine). A particular object is the elimination of the acid treatment of the intermediate products which is environmentally harmful and/or leads to disposal problems of the pickling solutions.

In the process of the invention described at the beginning, the object is accomplished by the following operating steps:

a. the block is subject to extrusion at a block temperature of 540° to 680° C. in any case, however, below the eutectic point, into an individual wire of a maximum diameter of 10 mm, b. the wire emerging from the extruder is chilled to a temperature below 250° C., the wire is continuously fed to a heating zone and heated up to a temperature between 200° and 280° C. which is the intake temperature for the immediately following reducing mill, d. the cross section of the wire is continuously reduced by rolling in at least three rolling steps where a maximum reduction of 25% is performed in each step until the desired cross section is obtained and e. the wire is cut into individual soldering rods.

The cross section is selected according to the requirements of the soldering process; soldering wires or rods can have round and prismatic (square) cross sections. The usual diameters for a round cross section are 1.5, 2.0, 2.5, 3.0, and 4.0 mm. For a square cross section, the length of the square edge is usually in the same order of magnitude.

Feature "a" permits a trouble-free continuation of the manufacture of the individual wire, i.e. those problems associated with the manufacture of wire bundles such as cross connections or deformations at the cut will not occur.

With feature "b," the material hardened by the extrusion is not only softened again but also, because of the chilling medium (usually water), the wire surface is largely protected from oxidation since the chilling ensues a rapid drop below the temperature necessary for oxidation and particularly since the water vapor formed by the chilling keeps away the oxidizing atmosphere.

Operating steps "a" and "b" are hence directly linked.

Whether the intermediate product is wound up and intermediately stored or directly further processed through operating steps "c" and "d" is determined by the data evaluated in those device where steps "c" and "d" are executed. The chilled wire is usually wound up and intermediately stored.

Features "c" and "d" in turn must again be considered in their direct interaction, i.e. the wire which is continuously heated up to match the intake temperature of the reducing mill is then immediately and at a constant speed fed to the reducing mill. In this mill, the thickness of the wire is continuously reduced by rolling in (at least) three rolling steps where a maximum reduction of 25% is applied each time and per step.

In a particularly advantageous configuration, such a "reducing mill" has so called Kocks-units where three individual rolls act on the material. These rolls are arranged around the axis of the material at angles of 120°. The profiles of the individual rolls are such that, alternatingly, they produce round and polygonal cross section. Details of such rolling mills, however, are prior art and need not be mentioned here.

Upon completion of the manufacture, the wire is cut to pieces of a desired length by means of shearing and stamping without further post treatment and without any tedious and harmful pickling in acid.

The manufacturing method is extraordinarily flexible as far as final products of different diameters and cross sections are concerned since it is possible for the extruded wire to always have the same diameter. It is then possible to adjust a desired diameter and cross section by adding individual blocks of the mill to the operation. This substantially reduces the tool costs for expensive extruder dies. Also, waste is drastically reduced, from 25% of the process known from prior art, for example, to 2% in the process of the invention.

This drastically reduces environmental load and recycling costs.

The wire can already be a finished product upon completion of operating step "d." In accordance with an improvement of the invention, however, it is also possible to further reduce a product of this kind in yet another rolling step to a smaller final cross section. The intermediate product of operating step "d" is for this purpose put in intermediate storage and prior to the continuation of the processing, it is heated up in a furnace to a temperature between 100° and 280° C., then withdrawn in the heated state and subject to at least one more rolling step.

As already mentioned, operating step "c" serves to heat up the wire to be reduced, if possible directly before entering the reducing mill, to a temperature within the indicated range. This is very advantageously carried out in that the heating up is carried out conductively by continuously passing the wire through spaced apart pairs of electrical contact rollers. This not only allows an extremely intensive heating up of the wire over a very short distance, but also the last pair of contact rollers can be arranged directly in front of the reducing mill so that thermal loss and oxidation are minimized. A conductive heating process can also be controlled in a very elegant and precise manner. At a constant distance between the pairs of electrical rollers, the nominal temperature of the wire at the end of the heating segment is measured, compared to a desired temperature and a possible difference is fed to a control device so as to adjust the supply of electrical energy.

It is expedient to maintain the wire temperature which is present at the intake to the reducing mill also within said range before entering each new unit of the mill. This is particularly easy to accomplish in the process of the invention with its continuous operation since the wire is additionally heated up by the forming procedure in each unit. It hence suffices to cool down the wire during or between the rolling steps to a temperature within said range of 200° to 280° C., preferably between 215° and 250° C. This is accomplished by correspondingly cooling the rolls which of course are in intimate thermal contact with the wire or by means of cooling devices disposed between the rolling steps.

The continuous operation usually covers the amount of material of one block with a length of 300 mm, a diameter of 83 mm and a weight of 11.7 kg. The processing thereof produces a continuous individual wire with a diameter of 4.8±0.1 mm and a length of approximately 85 m.

The continuity of the operation, however, can be further increased in another improvement of the invention. When the block is extruded, a remainder of material is left in the mold in front of the die upon completion of the extrusion. A portion of this remainder which faces away from the die is separated before a subsequent block is supplied again. Using the extrusion die, this subsequent block is then combined with the remaining portion of the remainder left in the mold in a heat-fusion process.

During the extrusion, contaminations are known to accumulate in this remainder, preferably at the outer marginal zones and in the portion of the remainder that faces toward the extrusion die. Experience has shown that when this remainder is extruded to near completion, the resulting wires exhibit a scale-like structure on their outer surface, they are prone to brittle fracture and can practically no longer be rolled. By separating and discarding this remainder, it is possible to maintain the purity of the soldering material to a very large extent even in a continuously operating process.

A defined remainder can be separated in a particularly advantageous and simple manner in that the remainder left in front of the die has a graduated diameter with the larger diameter facing the extrusion die. The portion contained in this larger diameter of the remainder is then separated prior to the heat-fusion process. The separation occurs where the diameter changes. The contaminations are thus in the outer area of the portion with the largest diameter and the cross section to be cut is the one with the smaller diameter of the portion left in the extrusion mold. It is thus possible to distinctly separate between pure and contaminated material. The new block is automatically and without problems attached by fusion in the subsequent extrusion process. The procedure is repeated and contaminations accumulate again in the newly left remainder of extrusion material.

The discontinuity caused during the manufacture of the individual wire by the above procedure, however, is limited to this part of the process since the individual wire is taken up on a reel. The take-up, the intermediate storage and the subsequent take-off allow a continuous reducing process over the entire wire length on the side of the reducing mill. What is relatively reduced is the so called "feeding loss," which occurs with each feeding of a new wire segment since the front portion of the wires, which is not guided between the contact rollers, is cold.

The invention also concerns an apparatus for the working of the described process.

In order to accomplish the essentially identical object, the apparatus of the invention is characterized by the following devices:

a. chilling device for the wire disposed directly behind the extruder, b. a device for measuring the wire speed, c. a device for taking up the wire controlled by the speed measuring device, d. a device for taking off the wire, e. a conductive heater with contact roller for the wire, and f. a reducing mill with at least three rolling units directly following the heater.

DETAILED DESCRIPTION OF THE PREFERRED EMBODIMENT

Figure 1:
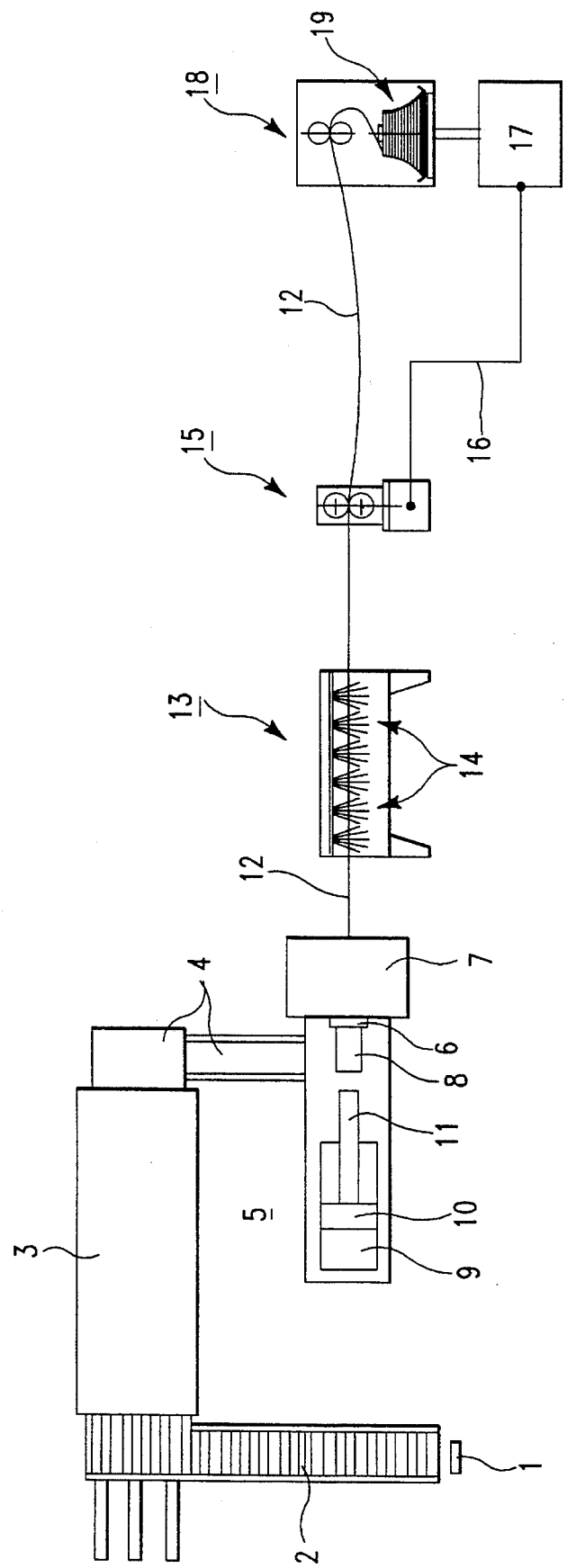
FIG. 1 is a process diagram of the process sequences beginning with the preheating of the block and ending with the take-up of the extruded individual wire.

FIG. 1 shows an individual block 1 which is supplied to a furnace 3 via an automated feeding device 2. The furnace is configured as a so called pusher-type furnace where several of the blocks 1 are heated up to the required extrusion temperature. At the exit of furnace 3, there is a feeder 4 for feeding individual blocks to an extruder 5. The extruder includes a die holder 6 which is partially covered by a housing 7 and a guide sleeve 8 to which the individual, heated blocks 1 are fed.

Further, at the opposite end the extruder has a pressing cylinder 9 with a piston 10 connected to a punch 11. Additional details of the extruder 5 will be explained in greater detail with reference to FIG. 3.

The extruder 5 produces a wire 12 which, immediately after emerging from the extruder, is fed to a chilling unit 13. In this chilling unit, the wire passes underneath a series of chilling nozzles 14.

The wire 12 then passes a speed measuring device 15 the electrical output signal of which is fed to a control arrangement 17 via a line 16. This arrangement 17 controls an actuator (not shown) of a take-up device 18 where a first spool of wire 19 is produced which is then put to intermediate storage. If the wire 12 already has its final diameter, the take-up device 18 is replaced by a cutter which will be further explained with reference to FIG. 5.

Figure 2:
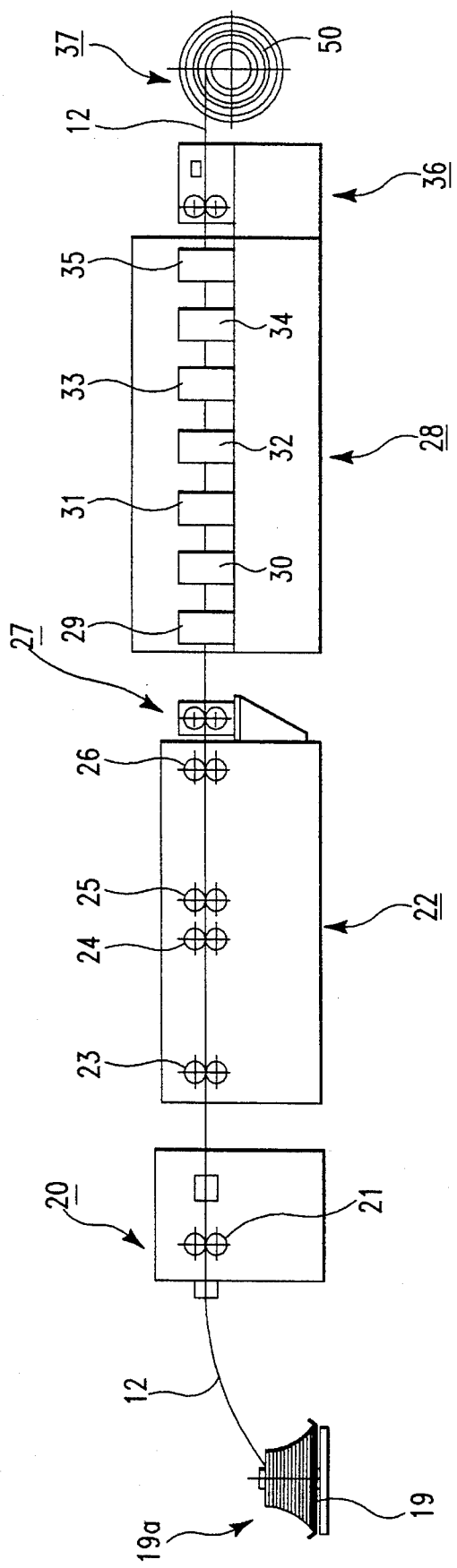
FIG. 2 is process diagram of the process sequences showing the conductive heating of the wire and the reduction of the wire cross section including the take-up of the rolled wire.

FIG. 2 shows the spool 19 of wire on a take-up device 19a after intermediate storage.

Wire 12 is wound off the spool 19 and first for cleaning purposes supplied to a brushing station 20 which comprises a vacuum device (not shown). During the brushing, the wire 12 is guided between rollers 21 which are driven at a constant speed and function as straightening rollers.

The brushing station 20 is followed by a heating station 22 which is configured as a conductive heating unit. The heating station comprises several pairs of contact rollers 23, 24, 25 and 26 which are connected to the output terminals of a low-voltage transformer. A corresponding switching creates a segment between the contact roller pairs 23 and 24 as well as between the contact roller pairs 25 and 26 in which a heating current passes through wire 12. The wire 12 itself acts as the heating resistor. A temperature sensor (not shown) in connection with a control arrangement (not shown) permits controlling the heating power such that the wire 12 will always have the same temperature upon emerging from the heating station 22.

A pair of rotary shears 27 is disposed immediately downstream of heating station 22. After a new segment of wire has been introduced, this pair of shears serves to cut off the front end thereof which cannot be heated up and hence must not be fed to the reducing mill 28. The operation of this pair of rotary shears is therefore advantageously temperature-controlled, i.e. short pieces are so long separated from the beginning of the newly supplied wire segment until the prescribed feeding temperature for the reducing mill is reached.

The reducing mill 28 comprises a total of seven units of rolls 29 to 35 which are adjusted such that in each unit, the cross section of the wire is reduced by a maximum of 25% with respect to the cross section present in the preceding unit. In order to obtain an optimum change of cross section, the cross sections of the rolls are alternatingly round and three-edged. This is a well known measure and is therefore not explained in greater detail.

Figure 5:
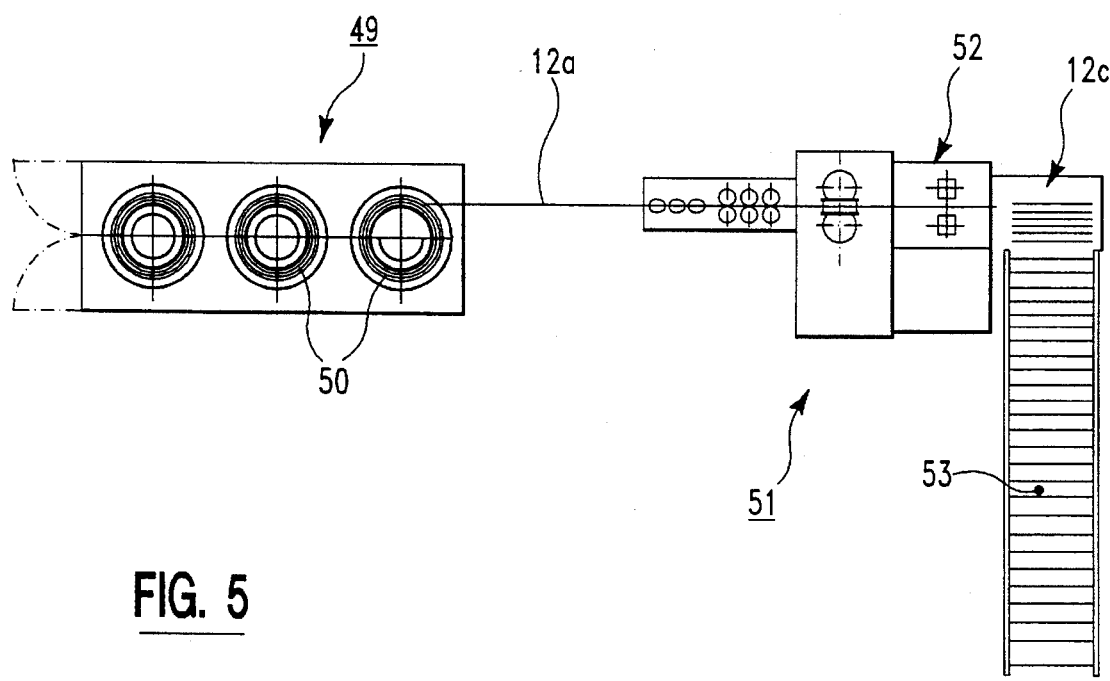
FIG. 5 is a process diagram for the process sequences of an optionally following continued reduction and forming of the wire cross section.

The number of the units of rolls which are added to the operation is determined by the desired cross section of the wire when the latter emerges from the reducing mill. It is hence not always necessary to also employ the last unit of rolls. Downstream of the reducing mill 28 there is a final stage 36 which serves the purpose of producing particularly small wire diameters. From this final stage 36, the wire is fed to another take-up device 37. Should the wire already have its final cross section, then the take-up device 37 will be replaced by a cutter as seen in FIG. 5.

Figure 3:
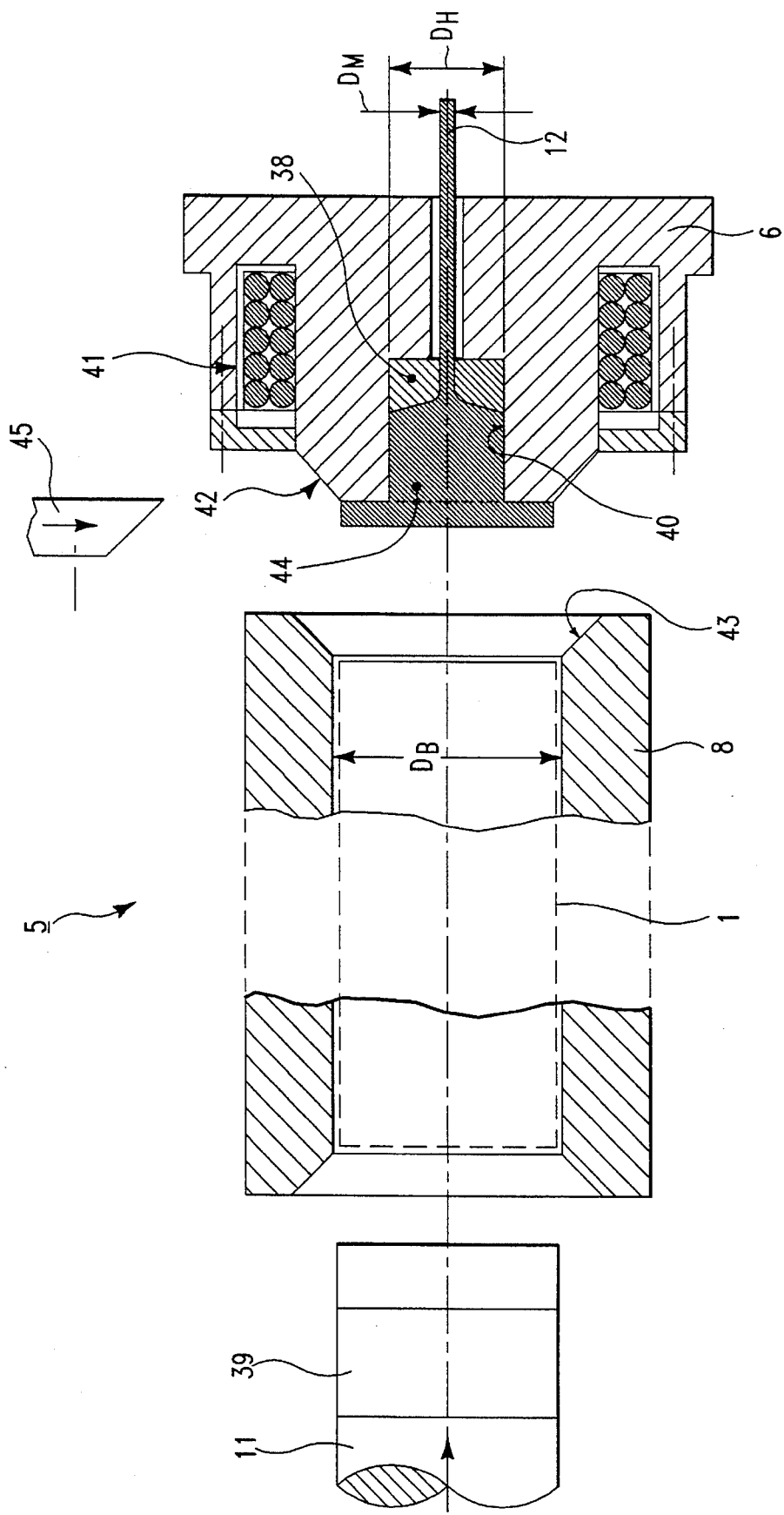
FIG. 3 shows the essential parts of an extruder for the manufacture of an individual wire.

FIG. 3 shows essential parts of extruder 5 including the die holder 6 with the inserted die 38, a guide sleeve 8 in which a preheated block 1 is inserted (shown in broken lines) and the punch 11 which is extended by a replaceable piece 39.

The die 38 is inserted into a coaxial bore 40 of the die which has a diameter $D_H$. Diameter $D_M$ of the die opening corresponds to the diameter of the wire.

On its outer circumference, the die holder is surrounded by an electrical heating resistor 41 which is enveloped by thermal insulation toward the outside. It is thus possible to heat up the die holder and the die to an isothermal temperature. On its side facing toward the punch 11, the die holder 6 has a conical surface 42 on which rests a complimentary conical surface 43 in the guide sleeve 8 such that this guide sleeve is exactly centered with respect to die bore 40.

The guide sleeve 8 has an internal diameter $D_B$. The diameters are graduated such that there is a first diameter difference between the internal diameter $D_B$ of the guide sleeve and diameter $D_H$ of die bore 40. A second diameter difference exists between diameter $D_H$ of the die bore and diameter $D_M$ of the die opening. As soon as the larger portion of block 1, driven by punch 11, has emerged from the die opening in the form of wire 12, a remainder 44 of extrusion material with graduated diameters remains in the mold. The smaller diameter corresponds to diameter $D_H$ of die bore 40 whereas the larger diameter corresponds to the internal diameter $D_B$ of the guide sleeve. This results in the formation of two different portions. The contaminations of block 1 are in the portion (larger diameter) which faces away from the die. A stamping knife hence cuts off this portion from the rest of the portion which remains in the die bore. The cut off portion is ejected and recycled.

When sleeve guide 8 is then rejoined to die holder 6, punch 11 presses a new block 1 against the remaining portion of this remainder 44 to which it will then be fused in a heat-fusion process. The extrusion process thus operates quasi continuously with no contamination accumulating until the multiple charging is finished.

Figure 4:
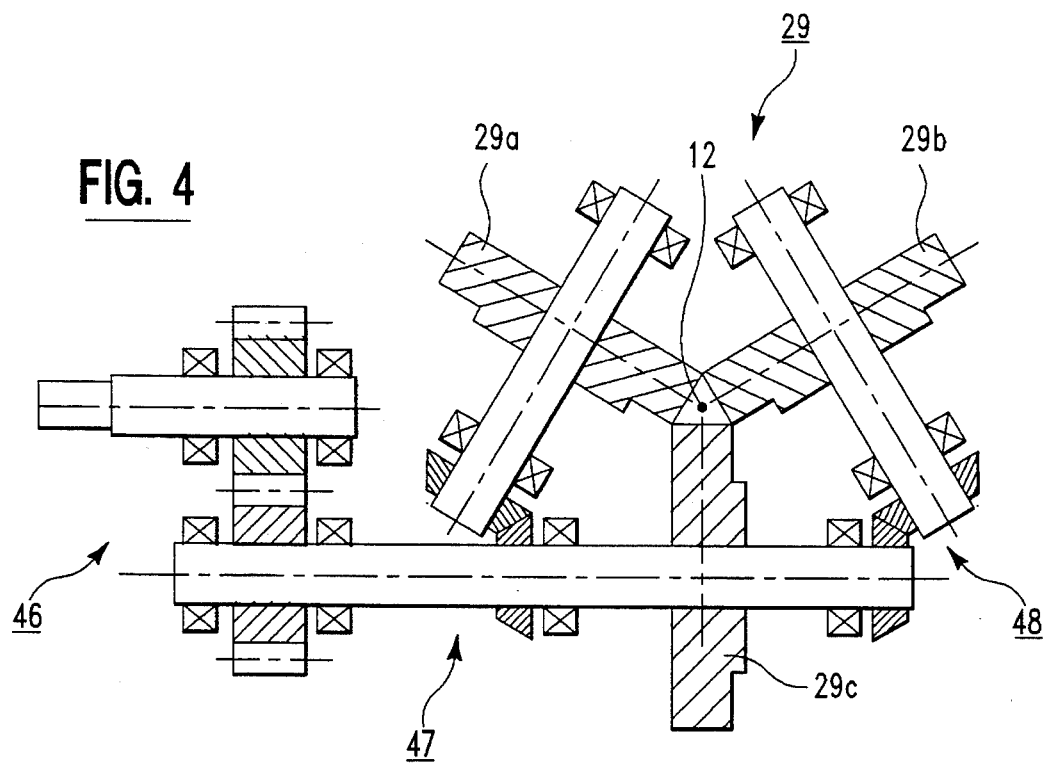
FIG. 4 is a section through an individual unit of the reducing mill (a so called Kocks unit)

FIG. 4 is a section across all axes of a unit of the rolling mill, in the present case across unit 29 of reducing mill 28. The individual rolls 29a, 29b and 29c are with their main planes equidistantly distributed over the circumference of wire 12. In this unit, the round, preheated wire cross section is, as represented, first turned into a triangular profile. The rolls consequently have cylindrical rolling surfaces. All rolls are driven by gear arrangement 46 with two of the rolls being additionally driven via conical gear pairs 47 and 48.

FIG. 5 shows an electrically heated furnace 49 to preheat several spools 50 of wire which were produced on the take-up device 37. From this preheating furnace, wire 12a which was obtained through wire 12, is fed to another reducing mill 51 which, in the present case, comprises four units of rolls that are not referenced in detail. The rotary cutter 52 cuts the wire into individual rods 12c of a prescribed length which, via a withdrawal device 53 are supplied to a packaging station (not shown). As mentioned earlier, the preheating furnace 49 and the additional reducing mill 51 are supplementary and used only for the manufacture of particularly thin soldering rods. When the final product of the arrangement of FIG. 2 has already the desired cross sectional dimensions, the take-up device 37 is replaced by rotary cutter 52 and withdrawal device 53 of FIG. 5.

EXAMPLE

In an apparatus according to FIGS. 1 to 5 blocks of 83 mm in diameter, 300 mm in length and 11.8 kg in weight were used to produce soldering rods of a square cross section of 2.0 mm×2.0 mm and a length of 385 mm. Upon exiting furnace 3, the blocks had an average temperature of 600° C. The die holder 6 was also heated up to a temperature of 600° C. The die 38 had such a (round) die opening that the extruded wire had a diameter of 4.8±0.1 mm. The extrusion speed was selected such that the wire speed amounted to 35 m/min.

In the chiller 13, the wire was chilled by water nozzles in such a way that the wire temperature, upon exiting, the chiller was at approximately 200° C. The wire was wound up on the winding device 18 at the above speed. Twenty blocks were successively processed producing a total wire length of 1,700 m. After each individual extrusion procedure, a residual portion of 0.8 kg of the remainder material were discarded so that approximately 11.0 kg of each block were turned into wire of a quality that was suitable for further processing.

The intermediately stored spool of wire 19 was then fed to a device of FIG. 2 and first subject to brushing in a brushing station 20. The wire was then fed to a heating station 22 at a speed of 35 m/min and emerging therefrom, it had an average temperature of 200° C. This was also the intake temperature for the reducing mill 28. In the first two units 29 and 30 of the reducing mill, the originally round wire was first rolled to prismatic cross sections. In the third unit 31, the wire was given a round cross section of 3.5 mm. Diameters of 3.0 mm and 2.5 mm were in further experiments produced at the exit of units 33 and 35. In units 32 and 34, the previously round cross section of the wire was again rolled into a prismatic (triangular) cross section. The wire temperature was maintained at approximately 200° C. by cooling the rolls. The individual wires 12 of various diameters were then stored on the take-up device 37.

The individual wire spools 50 from take-up device 37 were then fed to a device in accordance with FIG. 5. First, the spools 50 were heated up to a temperature of approximately 200° C. at which the wire could be readily withdrawn. The wires with their round cross sections of 3.5, 3.0, 2.5 and 2.0 mm were then in the reducing mill converted into square wires having cross sections 3×3 mm², 2.5×2.5 mm², 2×2 mm² and 1.5×1.5 mm², respectively. In the rotary cutter 52, they were then cut into segments of 385 mm.

The process ran trouble-free in all cases and produced straight soldering rods with a metallic shining and perfect cut surfaces.

The tests were carried out with soldering alloys in accordance with the following table. All tests produced perfect results with respect to the required specification.

| TEST No. | SOLDER | | | P % | Ag % | Sn ppm | Ni ppm | Fe ppm | Zn ppm | Pb ppm | Cu % |
|---|---|---|---|---|---|---|---|---|---|---|---|
| 1 | L Cu | P | 6 | 6,36 | — | 50 | 10 | 20 | | | Rest |
| 2 | L Cu | P | 7 | 7,43 | — | 50 | — | 10 | 10 | 10 | Rest |
| 3 | L Cu | P | 8 | 8,07 | — | 40 | — | — | — | — | Rest |
| 4 | L Ag 0,40 | P | | 6,30 | 0,40 | 20 | — | 10 | 10 | — | Rest |
| 5 | L Ag 2 | P | | 6,22 | 1,52 | 20 | — | — | — | — | Rest |
| 6 | L Ag 2 | P | | 6,28 | 1,61 | 30 | — | 30 | 40 | — | Rest |
| 7 | L Ag 2 | P | | 6,32 | 1,99 | 30 | — | 20 | 10 | — | Rest |
| 8 | L Ag 5 | P | | 6,23 | 3,84 | 30 | 10 | — | — | — | Rest |
| 9 | L Ag 5 | P | | 6,39 | 4,51 | 10 | — | 10 | 10 | — | Rest |
| 10 | L Ag 5 | P | | 6,28 | 4,79 | 20 | — | 20 | 50 | — | Rest |
| 11 | L Ag 15 | P | | 5,11 | 14,56 | 20 | 10 | 22 | 30 | 55 | Rest |

I claim:

1. Process for the manufacture of soldering rods containing at least 60 weight-% copper and at least one alloy component from the group phosphorus and silver by forming a block of corresponding copper alloy into a wire at temperatures below the eutectic temperature, characterized by the following process steps:
   a. extruding said block at a block temperature of 540° to 680° C. into a wire with a maximum diameter of 10 mm, said extruding being done through a die by an extruder and imparting an exiting speed to the wire,
   b. chilling the wire that emerges from the extruder to a temperature below 250° C.,
   c. continuous feeding of the wire to a heating zone and heating the wire up to temperature between 200° and 280° C. as an intake temperature for an immediately following reducing mill,
   d. continuous reduction of the wire to a desired cross section by rolling in at least three rolling steps with a 25% maximum reduction per rolling step,
   e. cutting the wire into segments of individual soldering rods.

2. Process in accordance with claim 1, characterized in that the block is extruded at a block temperature of 580° to 620° C.

3. Process in accordance with claim 1, characterized in that the wire, which emerges from the extruder, is chilled to a temperature below 200° C.

4. Process in accordance with claim 1, characterized in that in the heating zone, the wire is heated up to a temperature between 215° and 250° C.

5. Process in accordance with claim 1, characterized in that a round cross section is produced by process step "d."

6. Process in accordance with claim 5, characterized in that after process step "d." the wire is heated up in a furnace to a temperature between 200° and 280° C. and while heated, it is withdrawn and fed to the at least one additional rolling unit and subsequently cut into segments of individual soldering rods.

7. Process in accordance with claim 1, characterized in that the exiting speed of the wire, from the extruder is selected to be below 50 m/min.

8. Process in accordance with claim 1, characterized in that a maximum wire diameter of 6 mm is selected for the extruding step.

9. Process in accordance with claim 1, characterized in that between the chilling and the feeding to the heating zone, the wire is coiled, intermediately stored and is then uncoiled.

10. Process in accordance with claim 1, characterized in that the heating is accomplished by allowing a current to pass through the wire while the wire is continuously fed through spaced apart electric contact rollers.

11. Process as in claim 10 wherein said electric contact rollers are spaced a constant distance apart, said process comprising the additional steps of
   measuring the temperature of the wire as it emerges from the contact rollers,
   comparing the measured temperature to a desired temperature to obtain a difference, and
   controlling electrical power to said rollers based on said difference.

12. Process in accordance with claim 1, characterized in that between rolling steps, the wire is cooled down to a temperature between 200° C. and 280° C.

13. Process in accordance with claim 12, characterized in that between rolling steps, the wire is cooled down to a temperature between 215° and 250° C.

14. Process as in claim 1 for manufacturing soldering rods consisting of copper, silver and phosphorous, wherein said block is extruded at a temperature below the eutectic temperature for a combination of copper, silver, and phosphorous.

15. Process as in claim 1 for manufacturing soldering rods consisting of copper and silver, wherein said block is extruded at a temperature below the eutectic temperature for a combination of copper and silver.

16. Process in accordance with claim 1 wherein a remainder of said block of copper alloy is left in said extruder when extruding is completed, said process comprising the additional steps of
   removing a portion of said remainder from said extruder,
   providing a new block of said alloy in said extruder after removing said portion of said remainder, and
   combining said new block with said remainder by heat fusion.

17. Process in accordance with claim 1 wherein said die is isothermally heated.

18. Process in accordance with claim 1 wherein said soldering rods contain phosphorus.

19. Process in accordance with claim 18 wherein said soldering rods contain at least 5% by weight phosphorus.

20. Apparatus for producing wire for soldering rods from blocks of copper alloy containing at least 60% copper and at least one alloy component from the group phosphorus and silver, said apparatus comprising a first preheating furnace for the blocks and a downstream extruder, characterized by the following devices:

a. a chilling device 13 for the wire 12 which is disposed directly downstream of the extruder 5, b. a speed measuring device 15 for measuring wire speed, c. a take-up device 18 for coiling the wire which is controlled by the speed measuring device, d. a device 19a for uncoiling the wire, e. a conductive heater 22 with contact rollers 23, 24, 25, 26 for the wire, and f. a reducing mill 28 with at least three rolling units immediately downstream of heater 22.

21. Apparatus in accordance with claim 20, characterized by another take up device 27 for the wire which is immediately downstream of the reducing mill 28.

22. Apparatus in accordance with claim 20, characterized by a second preheating furnace 49 for the wire 12 downstream of the reducing mill 28 and another reducing mill 51 downstream of the second preheating furnace 49.

23. Apparatus in accordance with claim 20, characterized in that the extruder 5 has a die holder 6 which is provided with a heater 41.

\* \* \* \* \*